United States Patent [19]

Ault

[11] 3,851,283

[45] Nov. 26, 1974

[54] RING SUPERVISORY CIRCUIT

[75] Inventor: Cyrus Frank Ault, Wheaton, Ill.

[73] Assignee: Bell Telephone Laboratories, Inc., Murray Hill, N.J.

[22] Filed: Mar. 22, 1974

[21] Appl. No.: 453,990

[52] U.S. Cl................ 335/178, 317/155.5, 335/245

[51] Int. Cl................................................... H01h

[58] Field of Search........... 335/178, 177, 180, 181, 335/103, 159, 99, 245, 246, 101; 317/155.5

[56] References Cited

UNITED STATES PATENTS

| | | | |
|---|---|---|---|
| 1,158,898 | 11/1915 | Conrad | 335/103 |
| 2,455,060 | 11/1948 | Holmes | 335/178 |
| 2,575,812 | 11/1951 | Hufnagel | 335/101 |
| 3,508,121 | 4/1970 | Kobayashi et al. | 317/155.5 |

*Primary Examiner*—Harold Broome
*Attorney, Agent, or Firm*—J. C. Albrecht

[57] ABSTRACT

An electrical relay switch for determining the on-hook or off-hook status of a subscriber line subset responsive to direct current in the subscriber line. The electrical relay switch includes a centrally pivoted armature with a pole piece positioned under each end, each pole piece being coupled to a winding, one of which has a shorted turn for rejecting alternating current and the other has fewer turns and no shorted turn. The two windings are connected in series with each other and the ring lead of the subscriber line. When a ringing signal is applied, the combined effect of the winding arrangement is to provide an equal attractive force at each end of the armature whereby the forces cancel each other. With direct current present in the subscriber line the armature is attracted to the pole piece with the larger number of turns which causes a pair of electrical contacts to close resulting in an indication of the subscriber set going into an off-hook state.

7 Claims, 1 Drawing Figure

PATENTED NOV 26 1974 3,851,283
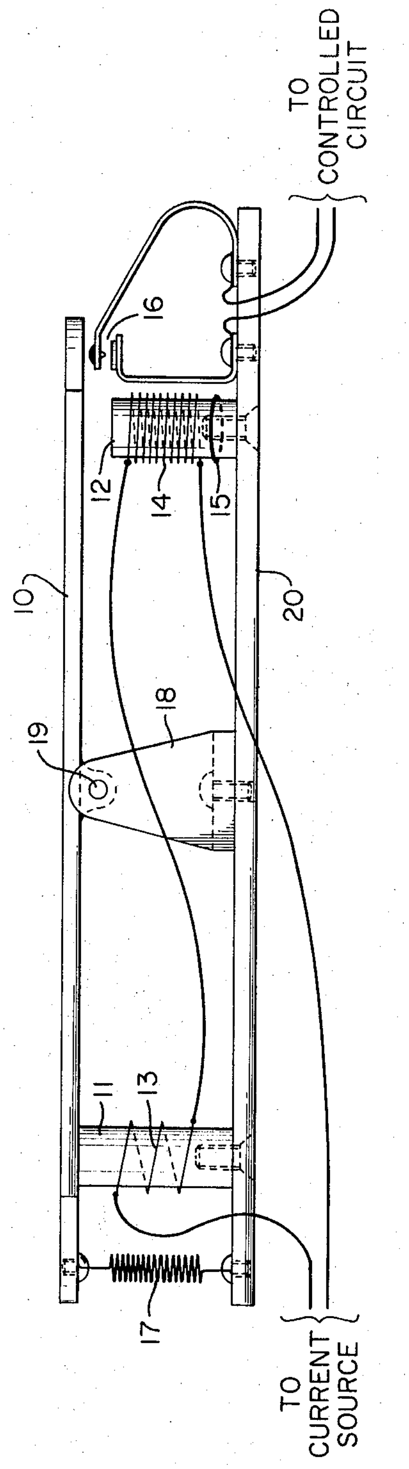

RING SUPERVISORY CIRCUIT

BACKGROUND OF THE INVENTION

This invention relates to telephone switching systems and particularly to the supervision of a subscriber line during ringing.

When a ringing signal is applied to a subscriber line it is necessary to supervise the on-hook or off-hook state of the subscriber line subset so that when the subset goes into the off-hook state the ringing signal can be removed from the line. The ring trip relay which performs this function must be able to detect direct current in the subscriber line which is in a circuit including the central office battery and also the characteristic resistance of the subscriber set which is placed across the line when the subscriber set is in its off-hook state. The ring trip relay must at the same time be sufficiently insensitive to alternating current so that the ringing signal will not cause the relay to operate falsely. The ring trip relay must also be able to ignore current due to the characteristic leakage resistance of the line. A currently used ring trip relay accomplishes the desired insensitivity to alternating current by including a shorted turn with the single relay winding. The shorted turn has the effect of reducing alternating current signals but not direct current signals whereby the relay has a high DC to AC sensitivity ratio with the result that the combined effect of the ringing current and the leakage current is not sufficient to operate the relay.

In many central office applications it is desired to connect the central office to telephone subsets which are beyond the normal operating range from the central office. As a result, means must be provided to overcome the line loss which is characteristic of such extension of a telephone subscriber line. One proposed range extension method might be to increase the voltage of the central office battery. However, this would increase the current in the subscriber line due to the leakage resistance so that a prior art ring trip relay might operate even though the subscriber set is on hook.

In an attempt to overcome the above problem, the alternating current sensitivity of a typical ring trip relay may be further reduced by adding to the armature a spring to ensure no response to the force generated by alternating current. This, however, would also reduce the direct current sensitivity and therefore not change the DC to AC sensitivity ratio. It is accordingly an object of this invention to provide a relay means which significantly reduced alternating current sensitivity without decreasing direct current sensitivity whereby a higher leakage current can be tolerated without having the combination of the alternating current and leakge current cause a false operation.

SUMMARY OF THE INVENTION

In one illustrative embodiment of this invention an electrical relay switch comprises two magnetic pole pieces associated with opposite ends of a centrally pivoted armature. The pole pieces have windings connected in series and wound in such a way that a current in the windings creates opposing attractive forces on opposite ends of the armature. The first pole piece has a winding with a predetermined number of turns and the second pole piece has a winding with a larger number of turns as well as a shorted turn. The shorted turn has the effect of reducing the magnetic field created by the second winding due to alternating current so that the reduced magnetic field is essentially equal to the magnetic field created by the first winding which has fewer turns. For direct current the larger number of turns in the second winding creates a larger magnetic field than that created by the first winding since the shorted turn has no effect on the magnetic field created by direct current.

When the magnetic field generated by the windings associated with the two cores is essentially the same, as in the case of alternating current, there is no movement of the armature. However, if the windings associated with the second pole piece generate a much larger magnetic field than those associated with the first, as in the case of direct current, then the end of the armature associated with the second pole piece will be attracted towards that pole piece. The armature operates a set of contacts on the end associated with the second pole piece, the contacts being arranged to close only when the armature is attracted towards the second pole piece. The armature is spring loaded at the end opposite the contacts which allows adjustment of the magnitude of direct current necessary to close the contacts.

In one advantageous use of the proposed invention it is connected in series with a telephone subscriber line when ringing current is applied and it has the desired effect of ignoring the ringing current while responding to direct current in the line when the subscriber subset goes into its off-hood state due to the characteristic resistance of the subscriber subset placed across the line and the central office battery.

BRIEF DESCRIPTION OF THE DRAWING

The organization and operation of an electrical relay switch according to this invention will be better understood from a consideration of the detailed description of the organization and operation of one illustrative embodiment thereof which follows when taken in conjunction with the accompanying drawing the single figure of which depicts an exemplary electrical relay switch.

DETAILED DESCRIPTION

One illustrative electrical relay switch according to this invention is shown in the drawing as comprising a first pole piece 11 and a second pole piece 12 being associated with opposite ends of a centrally pivoted armature 10. The first pole piece 11 has a winding 13 with a predetermined number of turns wound around it in such a way that a current in winding 13 will exert an attractive force on the associated end or armature 10. Pole piece 12 has a winding 14, with a greater number of turns than winding 13, wound around it. The winding 14 is connected in series with the winding 13 so that a current in winding 13 will also be present in winding 14 with the result that pole piece 12 also exerts an attractive force on the end of armature 10 associated with that pole piece. Pole piece 12 also has a shorted turn 15 coupled to it. The shorted turn 15 responds to a transient magnetic field created by winding 14 and thereby creates an opposing magnetic field which reduces the net effect of the magnetic field created by current present in winding 14. The windings 13 and 14 are of a number of turns and orientation such that when an alternating current is present in them the attractive forces exerted on the opposite ends of armature 10 are equal. If a direct current is present in windings 13 and 14, then after it has reached a steady state, the shorted turn 15 will have no opposing effect and the larger number of turns in winding 14 will result in a larger attractive force exerted on the associated end of the armature 10 which will thereby be physically attracted towards pole piece 12. Armature 10 is rotatably connected to support bracket 18 by means of a pintle 19. Support bracket 18 is fastened to base 20 along with pole pieces 11 and 12 in any convenient manner, such as the screw means shown.

The end of armature 10 associated with pole piece 12 also has associated with it a pair of contacts 16 fastened to base 20 which are normally open and are closed when armature 10 is attracted towards pole piece 12. The end of armature 10 which is associated with pole piece 11 is spring loaded with a spring 17 connected between armature 10 and base 20 which allows the adjustment of the amount of direct current necessary to close contacts 16. The relay arrangement thus described is advantageously responsive to direct current while at the same time being inoperable responsive to alternating current.

One exemplary use of a relay according to this invention is a line supervisory device in a telephone subscriber line when a ringing signal is applied to the line. Such a line supervisory device is commonly known as a ring trip relay and functions to detect the off-hook state of the subscriber subset when it is answered by the called party. The off-hook condition of the subset is detected by monitoring the direct current in the line. When the subset goes into the off-hook state the characterisitic resistance of the subset is placed across the line and causes direct curret to be present in the line because of the circuit completed with the central office battery. A ring trip relay also has the ring signal in its winding and is desirably as insensitive as possible to the ringing signal. There may, however, also be spurious direct currents in the subscriber line at this time; for example, current due to leakage resistance from the subscriber line to other lines or to ground. It is necessary that the ring trip relay not be falsely activated by the combination of the ringing signal and any spurious signals present in the subscriber line. Prior art ring trip relays have merely reduced the level of the sensitivity of the relay to the ringing signal whereas the relay of this invention has essentially eliminated any response to the ringing signal thereby allowing the other spurious signals to take on larger values without causing a false on-hook indication. This feature would allow the use of a higher voltage central office battery for range extension without causing unreliable operation due to the higher leakage currents resulting.

What has been described is considered to be only one specific illustrative embodiment of the invention and it is to be understood that various other arrangements may be devised by one skilled in the art without departing from the spirit and scope thereof as defined by the accompanying claims.

What is claimed is:

1. An electrical switch adapted for use in a circuit having alternating and direct current therein, said switch comprising a substantially centrally pivoted armature adapted to control electrical contacts, a first and a second pole piece associated respectively with opposite ends of said armature, a first winding connected in said circuit and coupled to said first pole piece, a second winding serially connected to said first winding and coupled to said second pole piece, said first winding having more turns than said second winding whereby the associated end of said armature is operated towards said first pole piece when said first winding is energized, and means for cancelling the effects of alternating current in said circuit comprising a single turn third winding on said first pole piece for generating counter fields to oppose a field generated by said first winding responsive to alternating current whereby said field generated in said first pole piece is reduced to be substantially equal to a field generated in said second pole poiece responsive to said alternating current.

2. An electrical switch comprising a substantially centrally pivoted armature adapted to control electrical contacts, a first and a second pole piece associated, respectively, with opposite ends of said armature, a first winding having a predetermined number of turns coupled to said first pole piece, a second winding having more turns than said first winding coupled to said second pole piece and serially connected to said first winding, said windings being arranged in an orientation whereby attractive forces are exerted on opposite ends of said armature when current is present in said first and said second windings, and a shorted turn winding on said second pole piece coupled to said second winding whereby said attractive force of said second winding on said armature responsive to alternating current is reduced to be substantially equal to said attractive force of said first winding.

3. In an electrical switch arrangement, a first pole piece having a first winding wound thereon with a predetermined number of turns, an armature adapted to control electrical contacts associated with said first pole piece whereby said first pole piece exerts a first attractive force on said armature when said first winding is energized, means for reducing alternating current sensitivity of said electrical switch arrangement comprising a single turn winding on said first pole piece for generating counter fields to oppose fields generated by said first winding responsive to alternating current, and a second pole piece with a second winding wound threon in a predetermined sense and a number of turns, energizable to generate a second attractive force on said armature equal to and opposing said first attractive force generated by said first pole piece responsive to alternating current.

4. In an electrical switch arrangement as claimed in claim 3 said armature having said first pole piece associated with one end and said second pole piece assocaited with the other end, said armature being pivotably mounted between said pole pieces.

5. In an electrical switch arrangement as claimed in claim 3, said second winding is connected in series with said first winding.

6. An electrical relay device comprising electrical contacts, armature means for operating said contacts, a first pole piece associated with said armature means, a first winding coupled to said first pole piece for generating when energized a first magnetomotive force for operating said armature means, and means for rendering said armature inoperable responsive to alternating currents comprising a single turn winding also coupled to said first pole piece for reducing the magnitude of said first magnetomotive force when said first winding is energized by alternating current, a second pole piece associated with said armature means, and a second winding coupled to said second pole piece for applying when energized a second magnetomotive force to said armature means of a direction opposite to that of said first magnetomotive force and of a magnitude equal to that of said last-mentioned force when reduced.

7. An electrical relay device as claimed in claim 6 in which said armature means is rotatably mounted between said first and econd pole pieces and said first and second windings are serially connected.

* * * * *